(12) United States Patent
Bauer

(10) Patent No.: US 8,794,697 B2
(45) Date of Patent: Aug. 5, 2014

(54) MOTOR VEHICLE WITH A DRAFT DEFLECTOR CASSETTE

(71) Applicant: Dr. Ing. h.c. F. Porsche Aktiengesellschaft, Stuttgart (DE)

(72) Inventor: Markus Alexander Bauer, Heusenstamm (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 13/950,858

(22) Filed: Jul. 25, 2013

(65) Prior Publication Data

US 2014/0035327 A1    Feb. 6, 2014

(30) Foreign Application Priority Data

Jul. 31, 2012 (DE) .......................... 10 2012 106 971

(51) Int. Cl.
- *B60J 7/22* (2006.01)
- *B60J 10/00* (2006.01)
- *B60J 7/11* (2006.01)

(52) U.S. Cl.
CPC ............... *B60J 7/22* (2013.01); *B60J 10/0062* (2013.01); *B60J 10/0065* (2013.01); *B60J 10/0014* (2013.01)
USPC ..................................... 296/217; 296/218

(58) Field of Classification Search
CPC ...... B60J 7/22; B60J 10/0014; B60J 10/0031; B60J 10/0062; B60J 10/0065
USPC .................................................. 296/217, 218
See application file for complete search history.

(56) References Cited

U.S. PATENT DOCUMENTS

| 6,217,110 | B1 * | 4/2001 | Thijssen ....................... 296/217 |
| 6,416,120 | B1 | 7/2002 | Schutt |
| 6,669,277 | B2 * | 12/2003 | Farber et al. .................. 296/217 |
| 7,108,317 | B2 * | 9/2006 | Tamura et al. ................ 296/218 |

FOREIGN PATENT DOCUMENTS

| DE | 2 138 162 | 2/1973 |
| DE | 199 55 712 | 5/2001 |
| DE | 10 2004 010 590 | 9/2005 |
| DE | 10 2008 058 158 | 5/2010 |
| GB | 1365993 | * 9/1974 |

OTHER PUBLICATIONS

German Search Report of Apr. 15, 2013.

* cited by examiner

*Primary Examiner* — Dennis H Pedder
(74) *Attorney, Agent, or Firm* — Gerald E. Hespos; Michael J. Porco; Matthew T. Hespos

(57) ABSTRACT

A motor vehicle has a cowl (1) with an upper frame part (2) and a closable vehicle roof opening (27) in the region of the upper frame part (2). The cowl (1) has a draft deflector cassette (6) for movably mounting a draft deflector. An interior lining (10) and a frame seal (9) are connected to a side of the upper frame part (2) that faces an interior of the vehicle and a decorative seal (17) interacts with the interior lining (10). The draft deflector cassette (6) is arranged between the frame seal (9) and the decorative seal (17). The draft deflector cassette can be placed, with simple installation, in a visually attractive manner in the region of the upper frame part (2) of the cowl frame.

12 Claims, 2 Drawing Sheets

MOTOR VEHICLE WITH A DRAFT DEFLECTOR CASSETTE

CROSS REFERENCE TO RELATED APPLICATION

This application claims priority under 35 USC 119 to German Patent Appl. No. 10 2012 106 971.9 filed on Jul. 31, 2012, the entire disclosure of which is incorporated herein by reference.

BACKGROUND

1. Field of the Invention

The invention relates to a motor vehicle with a cowl and a closable roof opening in the region of an upper part of a cowl frame. The cowl has a draft deflector cassette for movably mounting a draft deflector in the opening.

2. Description of the Related Art

DE 2 138 162 A discloses a motor vehicle with a draft deflector cassette positioned in a front rain channel that is arranged adjacent to the motor vehicle cowl frame and bounds the closable vehicle roof opening. Retaining means secure the draft deflector cassette in the rain channel.

It is an object of the invention to provide a motor vehicle with a draft deflector cassette that can be placed, with simple installation, in a visually attractive manner in the region of the upper frame part of the cowl frame.

SUMMARY OF THE INVENTION

The invention relates to a motor vehicle with a frame part and a lining on a side of the frame part that faces an interior compartment of the vehicle. A frame seal is connected to the frame part and a further seal interacts with the interior lining. A draft deflector cassette is arranged sealingly between the frame seal and the further seal and accommodates a draft deflector therein.

The motor vehicle is a convertible or targa and has a top that can be put away to form the vehicle opening. The targa form of vehicle has a top between targa bar and cowl.

The frame seal is fit in the region of the upper frame part of the cowl frame, the draft deflector cassette then is installed, and the further seal then is fit thereon. The further seal preferably is a decorative seal and is connected to the interior lining.

A portion of the interior lining preferably reaches behind the draft deflector cassette on the side thereof that faces away from the frame part and the further seal bears against this portion on the side thereof which faces away from the frame part. Thus, the further seal need not be connected to the interior lining by separate fasteners. It suffices if the further seal bears against the interior lining and, accordingly, seals the region between the interior lining and the draft deflector cassette. This arrangement of the further seal and interior lining means that the transition region from draft deflector cassette to interior lining has a particularly attractive visual appearance. The gap between draft deflector cassette and frame part is sealed downward with respect to the interior lining by the frame seal.

The draft deflector cassette preferably has a limb with a free end and a hook-shaped profile in a region of the free end of the limb receives the further seal. The further seal thus can be fastened to the draft deflector cassette in a particularly simple manner. In particular, the hook-shaped profile merely requires the further seal to be slipped or laterally pushed onto the limb of the draft deflector cassette.

The draft deflector cassette preferably is designed in a particularly simple manner with a cross-sectional profile formed by two limbs and a web connecting the limbs. Thus, the draft deflector cassette has a substantially U-shaped cross-sectional profile formed by the limbs and the web. The U-shaped cross-sectional profile provides a sufficient amount of space in the region of the draft deflector cassette for movably accommodating the draft deflector. The draft deflector may be mounted pivotably in the draft deflector cassette, preferably via at least two pivotable links that are in parallel to each other.

The frame seal preferably bears against the limb of the U-shaped draft deflector cassette that faces frame seal on the side thereof that faces the frame part, and the further seal is mounted in the other limb.

The draft deflector cassette is preferably is mounted in the interior lining. More particularly, the interior lining can rest on the draft deflector cassette in the region of the web thereof.

The frame seal and the further seal preferably are separate components that can be vulcanized onto each other to form a constructional unit. The upper frame part of the cowl frame may have upper and lower portions that are connected to each other in the region of webs directed toward the draft deflector cassette. The frame seal then is slipped onto the upper and lower portions in the region of the webs thereof. The frame seal therefore is guided precisely by the webs and retained there.

The draft deflector cassette preferably is integral with the further seal. Thus, installation is simpler than an arrangement where the draft deflector cassette and the further seal are separate components. Sealing also is improved since there is no transition to be sealed between the draft deflector cassette and the further seal. The diversity and number of parts also are reduced, thereby simplifying inventory management.

Both for the frame seal and for the further seal optionally are provided for vulcanizing said seals onto the components accommodating them.

Further features of the invention emerge from the attached drawing and the description of the preferred exemplary embodiments that are reproduced in the drawing, without being restricted thereto.

DETAILED DESCRIPTION OF THE PREFERRED EMBODIMENTS

Figure 1:
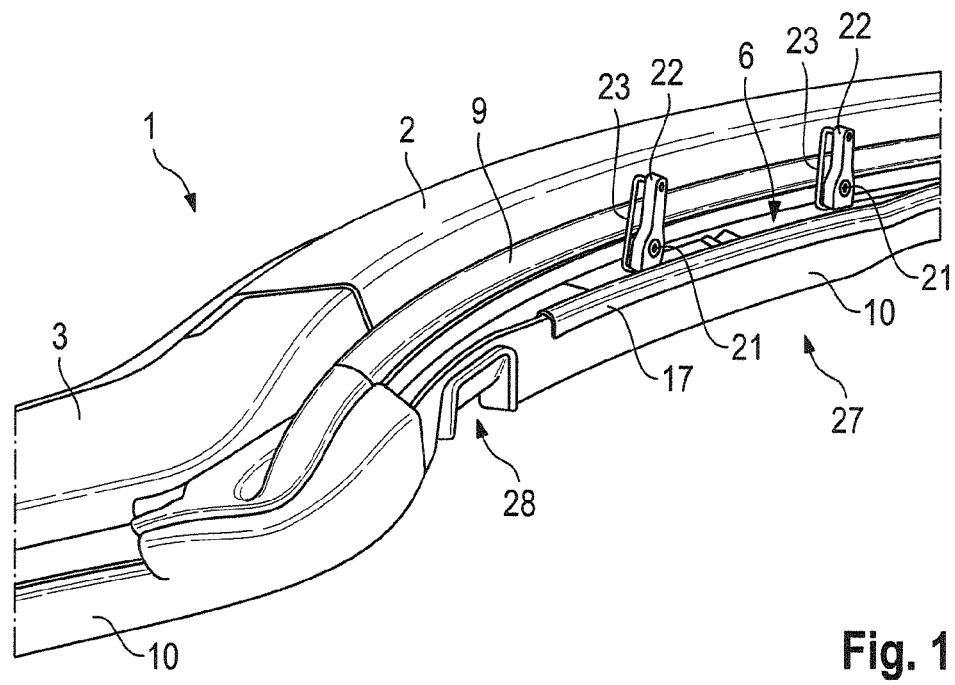
FIG. 1 is a perspective view of a motor vehicle according to a first exemplary embodiment of the invention in the region of the upper cowl, with a draft deflector cassette assigned thereto, a frame seal and a further seal.

FIG. 1 illustrates a cowl 1 for a passenger motor vehicle in the form of a convertible or a targa vehicle with a roof that can be put away. The cowl 1 has an upper frame part 2 and a lateral frame limb 3 adjoining the upper frame part 2. Only the upper end of the lateral frame limb 3 and the upper frame part 2, over a length extending approximately over half of the length of the upper frame part 2, are illustrated here.

Figure 2:
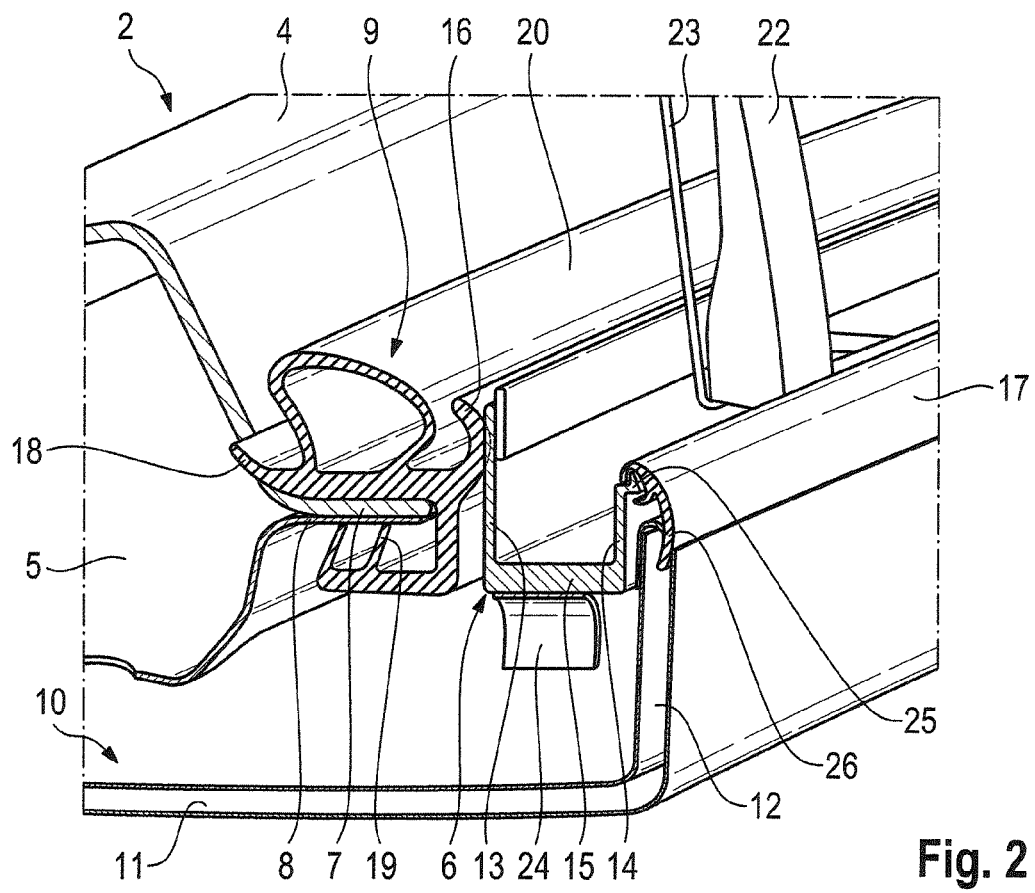
FIG. 2 is a cross-section through the arrangement according to FIG. 1, sectioned transversely with respect to the longitudinal extent of the draft deflector cassette.

FIG. 2 shows that the upper frame part 2 has an upper frame part portion 4 and a lower frame part portion 5. The upper and lower frame part portions 7 and 8 are provided respectively with upper and lower webs 7 and 8 on a side that faces away from the passenger motor vehicle windshield mounted in the cowl 2 and that faces a draft deflector cassette 6. The upper and lower webs 7 and 8 lie flat against each other and are welded together.

A frame seal 9 is pushed onto the web arrangement formed from the webs 7 and 8. The frame seal 9 extends in the described region of the upper frame part 2 and continues into the region of the lateral frame limbs 3 arranged on both sides of the vehicle. Only a partial region of the frame seal 9 is illustrated in the region of the illustrated lateral frame limb 3. The frame seal 9 seals off the upper frame part 2 from the roof, which can be put away, and seals off the lateral frame limbs 3 from the frameless side windows assigned to the driver's door and front passenger's door of the vehicle.

An interior lining 10 made of plastic lines parts of the upper frame part 2 and the lateral frame limbs 3 toward the passenger compartment of the motor vehicle. The interior lining has a base 11 and, on the side facing away from the upper frame part 2, an upwardly projecting limb 12. A receiving space is formed between the frame seal 9 in the region of the upper frame part 2 and the upper end of the limb 12 of the interior lining 10. The receiving space extends in the transverse direction of the vehicle and is intended for the draft deflector cassette 6

The draft deflector cassette 6 has a U-shaped cross-sectional profile formed by two limbs 13 and 14 and a web 15 connecting the limbs 13, 14. A lip 16 of the frame seal 9 bears against the region of the free end of the limb 13 of the draft deflector cassette 6. The lip 16 is illustrated in the relaxed position thereof. This is also true of all other lips, which are shown and have yet to be described in more detail. A further lip 18 of the frame seal 9 bears against the upper frame part 2 adjacent to the upper web 7. A further lip 19 of the frame seal 9 bears against the lower side of the lower web 8 of the frame part 2. The frame seal 9 has an upper sealing bead 20 that contacts the roof in the closed position to ensure sealing between the cowl 1 and the roof.

Bearing receptacles 21 are mounted in the limb 13 and accommodate pivotable links 22. A draft deflector (not illustrated) assigned to the draft deflector cassette 1 is mounted in the region of the ends of the links that face away from the bearing receptacles. The draft deflector can be transferred by the links 22 from a retracted position into an extended position bringing about the deflection of the draft. A spring 23 pretensions each link 22 into the extended position of the draft deflector so that the draft deflector automatically is transferred into the draft deflection position upon opening the roof.

The draft deflector cassette 6 is mounted in the interior lining 10. More particularly, the web 15 of the draft deflector cassette 6 rests on a plurality of projections 24 that project up from the interior lining 10. This ensures a defined installation position of the draft deflector cassette 6 with respect to the frame seal 9 and the interior lining 10, which is fastened to the cowl 1.

The free end of the limb 14 of the draft deflector cassette 6 has a hook-shaped profile 25 to receive a decorative seal 17. The decorative seal 17 is slipped or pushed onto the hook-shaped profile 25. The decorative seal 17 has a downwardly directed lip 26 that reaches behind the limb 12 of the interior lining 10 in the region of the free end of said limb 12 on the side facing away from the draft deflector cassette 6 and bears there against the interior lining 10.

The decorative seal 17 then is arranged between the draft deflector cassette 6 and the interior lining 10 that lines the upper region of the cowl 1, with the decorative seal 17 being joined onto the free-standing limb 14 of the draft deflector cassette 6, and the hook-shaped cross-sectional profile 25 is arranged on the draft deflector cassette 6.

The frame seal 9 may be a component part of the decorative seal 17. Installation involves fitting the frame seal 9 on the upper frame part 2 and the lateral frame limbs 3 of the cowl 1. The draft deflector cassette 6 for the draft deflector then is installed and mounted on the interior lining 10, and the decorative seal 17 is joined onto the draft deflector cassette 6. The decorative seal 17 is vulcanized onto the frame seal 9 to create a neat transition from the draft deflector cassette 6 to the interior lining 10 of the cowl 1 and to the cowl 1.

The motor vehicle is illustrated for the state in which the vehicle roof is open, and therefore a closable vehicle roof opening 27 is produced behind the cowl 1. Centering receptacles 28 are arranged in the region of the upper frame part 2 and receive centering roof pins (not illustrated specifically) of the convertible roof or a roof part of a targa vehicle when closing the roof.

Figure 3:
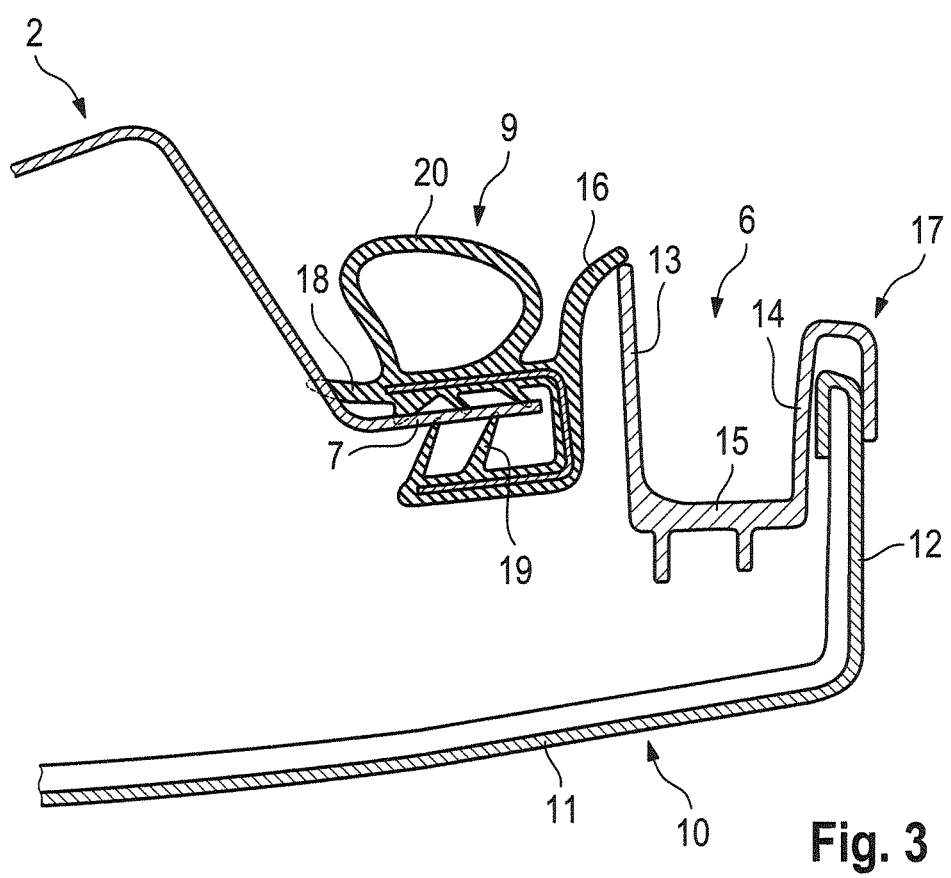
FIG. 3 is a cross-section similar to FIG. 2 but showing a second embodiment.

The embodiment of FIG. 3 differs from FIGS. 1 and 2 in that the draft deflector cassette 6 is unitary with the decorative seal 17. In the embodiment of FIG. 3, the limb 14 in the draft deflector cassette 6 and the decorative seal 17 form a U-shaped profile, and the decorative seal 17 reaches in the region of the lower end thereof behind the limb 12 of the interior lining 10. The decorative seal 17 therefore bears on the side of the limb 12 of the interior lining 10 that faces the vehicle roof opening 27 and provides sealing there. Although not illustrated in FIG. 3, the web 15 of the draft deflector cassette 6 may rest on the interior lining 10, in the same manner as in the embodiment of FIGS. 1 and 2.

What is claimed is:

1. A motor vehicle, comprising: a cowl having an upper frame part and a closable vehicle roof opening arranged in a region of the upper frame part, a draft deflector cassette mounted to the upper frame part for movably accommodating a draft deflector, an interior lining on a side of the upper frame part that faces an interior compartment of the vehicle, a frame seal connected to the upper frame part and a decorative seal mounted to the interior lining, the draft deflector cassette being between the frame seal and the decorative seal and being sealed by at least the fame seal, wherein the upper frame part has an upper portion and a lower portion provided respectively with upper and lower webs that are directed toward the draft deflector cassette, the frame seal being slipped onto the webs.

2. The motor vehicle of claim 1, wherein a portion of the interior lining is between the decorative seal and a side of the draft deflector cassette that faces away from the upper frame part, the decorative seal bearing against a side of the portion of the interior lining that faces away from the upper frame part.

3. The motor vehicle of claim 2, wherein the draft deflector cassette has a U-shaped cross-sectional profile with first and second limbs and a web connecting said limbs.

4. The motor vehicle as claimed in claim 3, wherein the frame seal bears against a side of the first limb that faces the upper frame part, and the decorative seal is mounted on the second limb.

5. The motor vehicle of claim 1, wherein the draft deflector cassette is extended by the decorative seal.

6. The motor vehicle of claim 2 wherein a limb of the draft deflector cassette has a free end and a hook-shaped profile in proximity to the free end for receiving the decorative seal.

7. The motor vehicle of claim 1, wherein the draft deflector cassette is mounted on the interior lining.

8. The motor vehicle of claim 7, wherein a web of the draft deflector cassette rests on the interior lining.

9. A motor vehicle, comprising: a cowl having an upper frame part and a closable vehicle roof opening arranged in a region of the upper frame part, a draft deflector cassette mounted to the upper frame part for movably accommodating a draft deflector, the draft deflector cassette having a U-shaped cross-sectional profile with first and second limbs and a web connecting the limbs, an interior lining on a side of the upper frame part that faces an interior compartment of the vehicle, a frame seal connected to the upper frame part and a decorative seal mounted to the interior lining, the draft deflector cassette being between the frame seal and the decorative seal and being sealed by at least the fame seal, a portion of the interior lining being between the decorative seal and a side of the draft deflector cassette that faces away from the upper frame part, the decorative seal bearing against a side of the portion of the interior lining that faces away from the upper frame part, the frame seal bearing against a side of the first limb that faces the upper frame part, and the decorative seal being mounted on the second limb.

10. The motor vehicle of claim 9 wherein the second limb of the draft deflector cassette has a free end and a hook-shaped profile in proximity to the free end for receiving the decorative seal.

11. The motor vehicle of claim 9, wherein the draft deflector cassette is mounted on the interior lining.

12. The motor vehicle of claim 11, wherein the web of the draft deflector cassette rests on the interior lining.

* * * * *